United States Patent
Fujii et al.

(10) Patent No.: US 7,270,689 B2
(45) Date of Patent: Sep. 18, 2007

(54) REFORMER

(75) Inventors: Hidetsugu Fujii, Chiba (JP); Fumitake Watanabe, Chiba (JP); Katsuya Uehara, Chiba (JP); Yukuo Katayama, Tokyo (JP)

(73) Assignees: Toyo Engineering Corporation, Tokyo (JP); K. E. M. Corporation, Tokyo (JP)

(*) Notice: Subject to any disclaimer, the term of this patent is extended or adjusted under 35 U.S.C. 154(b) by 0 days.

(21) Appl. No.: 10/890,973

(22) Filed: Jul. 14, 2004

(65) Prior Publication Data
US 2005/0013752 A1     Jan. 20, 2005

(30) Foreign Application Priority Data
Jul. 14, 2003   (JP) .............................. 2003-274179

(51) Int. Cl.
*C01B 3/32* (2006.01)

(52) U.S. Cl. .................. 48/198.7; 48/127.9; 422/191; 422/193; 422/194; 422/195; 422/198; 422/211; 422/222

(58) Field of Classification Search ............... 48/127.9, 48/198.7; 422/188–191, 193–195, 198, 211, 422/222
See application file for complete search history.

(56) References Cited

U.S. PATENT DOCUMENTS 3,444,099 A * 5/1969 Sinfelt et al. ............... 502/306
6,576,208 B1 * 6/2003 Itoh et al. .................... 423/247
6,977,002 B2 * 12/2005 Takimoto et al. .............. 48/61
2002/0006535 A1 * 1/2002 Woods et al. .................. 429/17
2002/0141917 A1 * 10/2002 Komaki et al. ............. 422/196

FOREIGN PATENT DOCUMENTS

| EP | 1 245 532 A2 | 10/2002 |
| JP | 2000-319006 | 11/2000 |
| JP | 2003-112903 | 4/2003 |

* cited by examiner

*Primary Examiner*—Basia Ridley
(74) *Attorney, Agent, or Firm*—Knobbe Martens Olson & Bear, LLP (57) ABSTRACT

A reformer for reacting a raw material gas to be reformed, with an oxidizing agent gas and a reforming agent gas in the presence of an oxidation catalyst and a reforming catalyst to obtain a hydrogen-containing gas, including: a set of catalyst layers consisting of an oxidation catalyst layer and a reforming catalyst layer, and two or more inlets for feeding the oxidizing agent gas to the oxidation catalyst and/or the reforming catalyst in plural stages. The reformer can produce a hydrogen-containing gas without forming a combustion region of a temperature of as high as one thousand and several hundreds centigrade and can be manufactured at a low cost.

27 Claims, 8 Drawing Sheets

REFORMER

BACKGROUND OF THE INVENTION

1. Field of the Invention

The present invention relates to a reformer for obtaining a hydrogen-containing gas from a raw material gas such as a natural gas. Particularly, the present invention relates to a reformer for obtaining a hydrogen-containing gas by reacting a raw material gas to be reformed, with an oxidizing agent gas and a reforming agent gas. The hydrogen-containing gas thus obtained may be utilized, for example, as a fuel for a fuel cell or as a synthetic gas which is a raw material for synthesis of methanol, ammonia, hydrocarbon oil or hydrocarbons.

2. Discussion of the Background

As a process for producing a hydrogen-containing gas, there are well known a steam reforming process in which steam is used as a reforming agent for reforming a raw hydrocarbon material such as a natural gas, and a partial oxidation process in which a raw hydrocarbon material, such as a natural gas, and an oxidizing agent, such as oxygen, oxygen-enriched air and air, are used.

Figure 2:
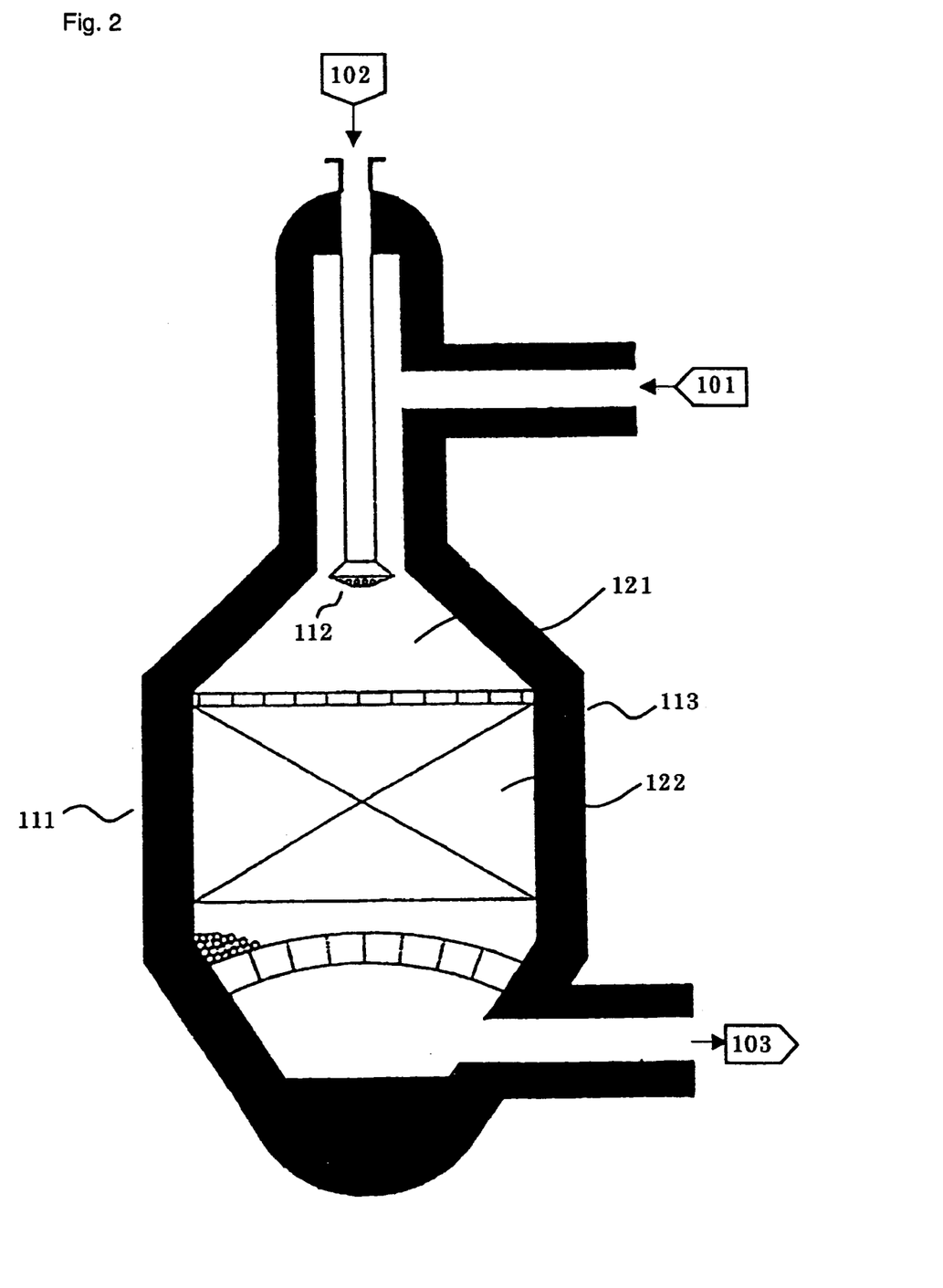
FIG. 2 is a schematic drawing showing a conventional reformer.

Referring to FIG. 2, there is explained a process for producing a hydrogen-containing gas using a steam reformer of internal heating type, wherein a raw material natural gas is reacted with an oxidizing agent gas and a reforming agent gas to obtain a hydrogen-containing gas.

Reactor 111 is constituted by combustion zone 121 equipped with burner 112, which is provided at the upper portion of the reactor, and reforming zone 122 filled with a steam reforming catalyst, which is provided at the lower portion of the reactor. The inside of reactor 111 is lined with refractory 113 such as brick for resistance to a high-temperature flame. Mixed gas 101 of a natural gas and a reforming agent gas is mixed with oxidizing agent 102 such as air at burner 112, and part of the natural gas is partially combusted. The heat generated by this combustion gives rise to a steam reforming reaction between the hydrocarbons in the remaining natural gas and the reforming agent gas during their passage through reforming zone 122; thereby, hydrogen-containing gas 103 composed mainly of hydrogen and carbon monoxide is produced.

In the above partial combustion, a flame is formed. When the flame contacts with the catalyst of reforming zone 122 at the lower portion of the reactor, a temperature of as high as one thousand and several hundreds centigrade is reached and the catalyst is melt; as a result, phenomena such as decrease in catalyst activity appear. Therefore, various proposals have been made to avoid such problems.

For solving the above problems, JP-A-2000-319006 discloses a technique for making uniform the temperature of the catalyst layer. This document discloses a fuel reforming apparatus for forming a hydrogen-containing gas, wherein a gaseous mixture of a fuel gas, steam and an oxygen-containing gas is introduced into a reactor having a catalyst filled in its upstream side and another catalyst filled in its downstream side to form a hydrogen-containing gas.

In this apparatus, there is provided, in a part of the catalyst layer at the upstream side of the reactor, non-contact passages in which the gas introduced makes no contact with the catalyst. In this structure, the gaseous mixture of a fuel gas, steam and an oxygen-containing gas, fed into the catalyst layer at the upstream side of the reactor forms a high-temperature zone; meanwhile, the gaseous mixture passing through the non-contact passages makes no direct contact with the high-temperature zone, but contacts the high-temperature zone via the walls of the non-contact passages and reaches the catalyst layer at the downstream side of the reactor.

As a result, the gas passing through the non-contact passages is exposed to a high temperature. Since this gaseous mixture contains oxygen, it is highly possible that the gaseous mixture forms a detonating gas depending upon the case.

Further, JP-A-2003-112903 discloses a small-sized fuel reformer in which the heat generated in a combustion catalyst part is transferred efficiently to a stream reforming catalyst part and thereby the generation of a reformed gas at the stream reforming part is enhanced.

In the above fuel reformer, the interface between the combustion catalyst part and the steam reforming catalyst part is formed in such a conical shape that the axial direction dimension (height) of the vertical cross section of the steam reforming catalyst part is made gradually smaller as the position of the height shifts from the periphery of the vertical cross section to its center; the reaction heat generated in the combustion catalyst part can be transferred to the steam reforming catalyst part more efficiently; and the formation of reformed gas is enhanced.

SUMMARY OF THE INVENTION

The object of the present invention is to provide a reformer which can produce a hydrogen-containing gas without generating a combustion zone of temperature of as high as one thousand and several hundreds centigrade, and which can be manufactured at lower cost.

The inventors found that the inner temperature of a reformer which was packed with an oxidation catalyst and a reforming catalyst can be kept low by introducing a raw material to be reformed, an oxidizing agent gas and a reforming agent gas into the reformer and feeding the oxidizing agent gas in plural stages to the reformer. The present invention has been achieved based on this finding.

The present invention provides a reformer for reacting a raw material gas to be reformed, with an oxidizing agent gas and a reforming agent gas in the presence of an oxidation catalyst and a reforming catalyst to obtain a hydrogen-containing gas, comprising:

a set of catalyst layers consisting of an oxidation catalyst layer and a reforming catalyst layer, and two or more inlets for feeding the oxidizing agent gas to the oxidation catalyst and/or the reforming catalyst in plural stages.

In the reformer of the present invention, a second reforming catalyst layer may be further provided, and the inlets may be arranged at a location where the oxidation agent gas is able to be fed to said set of catalyst layers and at a location where the oxidation agent gas is able to be fed to the second reforming catalyst layer.

In the reformer of the present invention, the inlets may be arranged at different locations where the oxidation agent gas is able to be fed to said set of catalyst layers.

In the reformer of the present invention, two or more of the sets of catalyst layers may be provided, and the inlets may be arranged at locations where the oxidation agent gas is able to be fed to each set of catalyst layers.

By using the oxidation catalyst, it is possible to lower the reaction start temperature of the reformer; by feeding the oxidizing agent gas in plural stages, it is possible to make the temperature distribution inside the reformer more uniform and to lower the level of the temperature distribution; as a result, it is possible to eliminate expensive refractory such as brick and to reduce manufacturing costs of a reformer. Further, the low temperature inside the reformer can suppress the deterioration of the catalysts and coke formation.

1: raw material to be reformed (raw material gas), 2: reforming agent gas, 2a: steam, 2b: carbon dioxide, 3: oxidizing agent gas, 4: mixed raw material gas (gaseous mixture of raw material gas and reforming agent gas), 5: hydrogen-containing gas, 11: reactor vessel, 12: oxidation catalyst layer, 13, 15: reforming catalyst layer, 14: set of catalyst layers, 21, 22: line, 31: pipe for feeding raw material gas, 32: oxidizing agent gas feeding pipe, 33: second oxidizing agent gas feeding pipe, 34: third oxidizing agent gas feeding pipe, 41: inlet nozzle, 42: outlet nozzle, 51: header, 52: nozzle, 53: oxidizing agent gas feeding pipe, 101: gaseous mixture of natural gas and reforming gas, 102: oxidizing agent, 103: hydrogen-containing gas, 111: reactor, 112: burner, 113: refractory, 121: combustion zone, 122: reforming zone.

DETAILED DESCRIPTION OF THE INVENTION

By using an oxidation catalyst, which is also referred to as a combustion catalyst, it is unnecessary to generate, with a burner or the like, a combustion zone of high temperature of as high as one thousand and several hundreds centigrade in order to give rise to combustion, oxidation can be started at a temperature of several hundreds centigrade, accordingly a hydrogen-containing gas can be produced at a low cost.

As the raw material gas to be reformed, there may be used a known raw material which can be reformed to produce a hydrogen-containing gas, or a gas obtained by vaporizing thereof if necessary. As a preferred example, there can be mentioned a gas containing at least one selected from the group consisting of methane, ethane, propane, butane, natural gas, methanol, dimethyl ether and partially reformed gases thereof.

The above raw material gas may include hydrogen and/or carbon dioxide added from outside.

The reforming agent gas endothermically reacts with the raw material gas to produce a hydrogen-containing gas. As the reforming agent gas, there can be mentioned a gas containing at least one selected from the group consisting of steam and carbon dioxide gas. The reforming agent gas may be steam, carbon dioxide or a mixed gas of steam and carbon dioxide.

The oxidation agent gas oxidizes the raw material gas. Since the oxidation reaction is exothermic, the oxidation agent gas may be used for raising the temperature inside the reactor. Also, the oxidizing agent gas may partially oxidize the raw material to produce a hydrogen-containing gas. As a preferred example of the oxidizing agent gas, there can be mentioned oxygen, oxygen-enriched air, or air.

As the hydrogen-containing gas, there can be mentioned a gas containing hydrogen as a major component and also containing carbon monoxide, carbon dioxide, a hydrocarbon such as methane, steam, etc., and a gas containing carbon monoxide as a major component and also containing hydrogen, carbon dioxide, a hydrocarbon such as methane, steam, etc.

Figure 1:
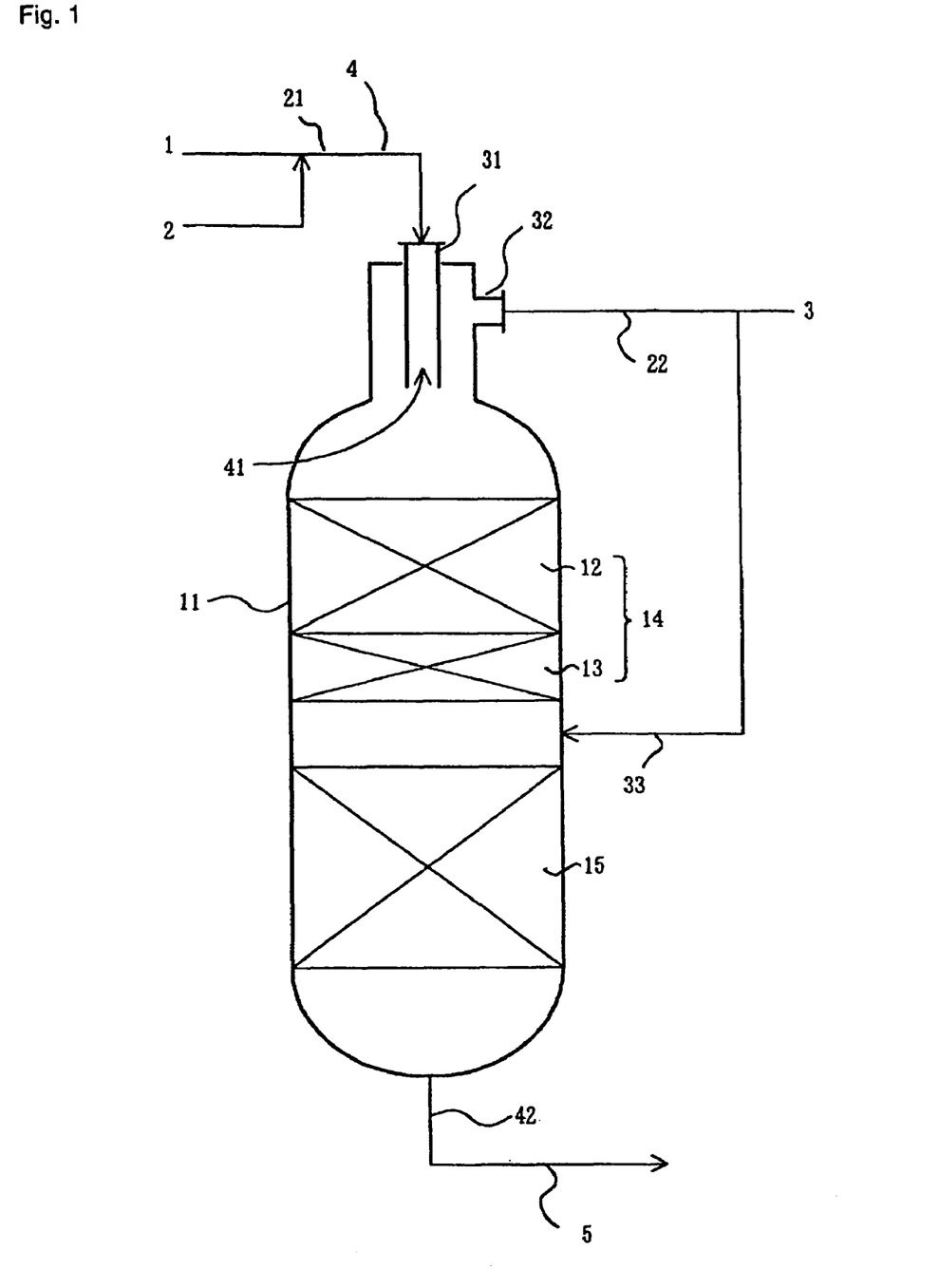
FIG. 1 is a schematic drawing showing an embodiment of the reformer of the present invention.

An embodiment of the present invention is described in detail referring to FIG. 1.

A reactor vessel 11 is equipped with an inlet nozzle 41; a set 14 of catalyst layers consisting of an oxidation catalyst layer 12 packed with an oxidation catalyst and a reforming catalyst layer 13 packed with a reforming catalyst; a second oxidizing agent gas-feeding pipe 33; a reforming catalyst layer 15 packed with a reforming catalyst; and an outlet nozzle 42.

The inlet nozzle 41 includes a raw material gas-feeding pipe 31 and an oxidizing agent gas-feeding pipe 32.

A raw material gas 1 (e.g. a natural gas) to be reformed and a reforming agent gas 2 are mixed to become a mixed raw material gas 4, pass through line 21, and are fed to the raw material gas-feeding pipe 31 provided at the inlet portion of the reactor vessel 11. An oxidizing agent gas 3 passes through line 22, is fed to the oxidizing agent gas-feeding pipe 32, and is mixed with the mixed raw material gas 4 at the inlet nozzle 41 provided upstream of the set 14 of catalyst layers.

Here, the reforming agent gas 2 is mixed with the raw material gas 1 before entering the reactor vessel. However, the reforming agent gas 2 need not be mixed with the raw material gas 1 and may be mixed with the oxidizing agent gas 3 instead before entering the reactor vessel. The reforming agent gas 2 may be mixed as necessary with either or both of the oxidizing agent gas 3 and the raw material gas 1. The reforming agent gas need not be mixed beforehand, and each of the reforming agent gas, the raw material gas and the oxidizing agent gas may be fed independently to the reactor vessel.

In the embodiment shown in FIG. 1, the raw material gas-feeding pipe 31 and the oxidizing agent gas-feeding pipe 32 are integrated to make the inlet nozzle 41. However, the two pipes need not be integrated and a plurality of pipes may be individually used as necessary in order to feed each gas. There is no particular restriction as to the constitution of inlet nozzle 41. It is preferable to consider uniformity of feeding of gases to the oxidation catalyst layer 12, in arranging the raw material gas-feeding pipe 31 and the oxidizing agent gas-feeding pipe 32.

The openings of inlet nozzle 41 are provided, in FIG. 1, above the oxidation catalyst layer 12 but may be provided at the uppermost part (inside) of the oxidation catalyst layer 12.

Figure 3:
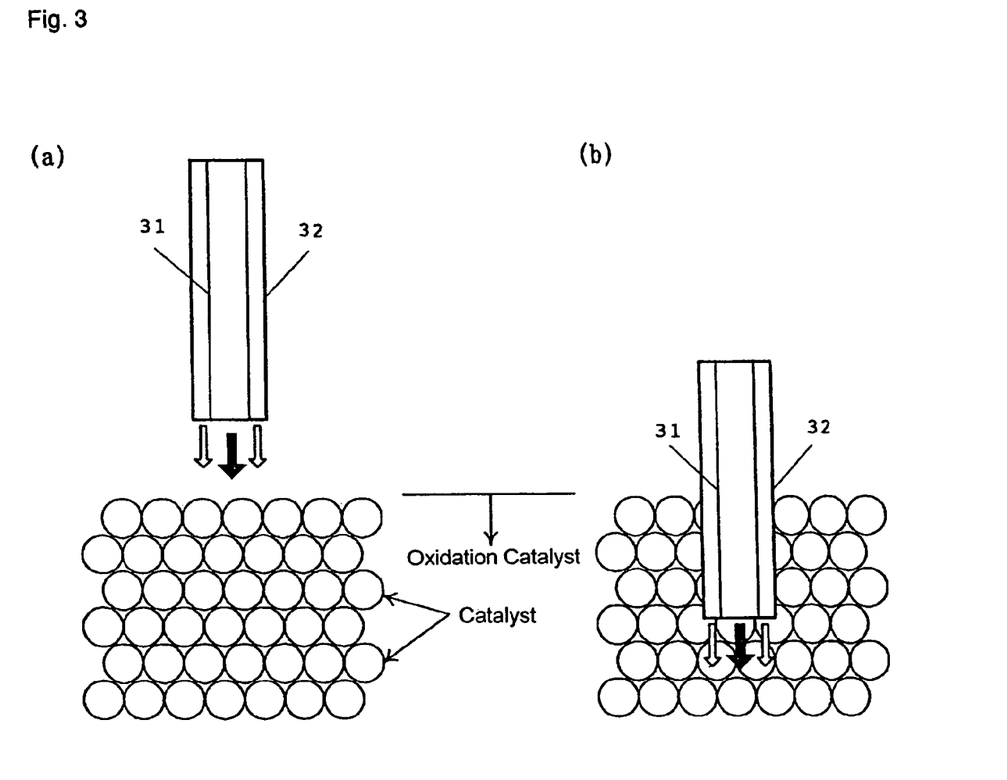
FIG. 3 is a drawing showing modes of the gas-feeding method employed in the present invention.

In FIG. 3 are shown examples of the state in which the openings of inlet nozzle 41 are provided. FIG. 3(*a*) illustrates a case in which the feeding pipes and the catalyst layer are apart, and FIG. 3(*b*) illustrates another case in which the openings of feeding pipes are provided at the uppermost part of the catalyst layer.

In FIGS. 3(a) and 3(b), a solid (black) arrow indicates a flow of the raw material gas fed from the raw material gas-feeding pipe 31 to the combustion catalyst layer 12, and outlined (white) arrows indicate a flow of the oxidizing agent gas fed from the oxidizing agent gas-feeding pipe 32 to the combustion catalyst layer 12.

In FIG. 1 is shown a set 14 of catalyst layers provided inside reactor vessel 11, in which the oxidation catalyst layer 12 and the reforming catalyst layer 13 are formed consecutively.

The mixed raw material gas 4 and a part of the oxidizing agent gas 3 are fed to the catalyst layer 12 packed with the oxidation catalyst, via the inlet nozzle 41, at a temperature at which the oxidation catalyst functions.

A preferred temperature at which gases are fed to the oxidation catalyst layer, depends upon the compositions of the gases. A relatively low temperature is preferred when hydrogen, which has quick oxidation rate, is contained in a large amount. A relatively high temperature is preferred when hydrocarbon components such as methane and the like are contained in a large amount.

The mixed raw material gas and the oxidizing agent gas are reacted with each other on the oxidation catalyst to form oxidation products. The oxidation products are carbon monoxide, carbon dioxide, water, etc. and a large amount of heat is generated by the reaction.

As the combustion catalyst, there may be used an ordinary commercially available catalyst such as palladium based, manganese based, lanthanum based, vanadium based or barium based catalyst. The shape thereof is, for example, a pellet, a ring or a spoke. The combustion catalyst may be formed by extrusion molding.

The oxidation reaction is started preferably at a condition that the feeding gas temperature is at least 300° C. and at most 600° C., and is ended preferably at 800° C. or more and 1,200° C. or less. The combustion products are then fed consecutively from oxidation catalyst layer 12 to reforming catalyst layer 13. It is preferable to keep the temperature of oxidation reaction at most 1,200° C. from a viewpoint of suppressing carbon deposition from the carbon-containing components included in the raw material gas 1.

Figure 8:
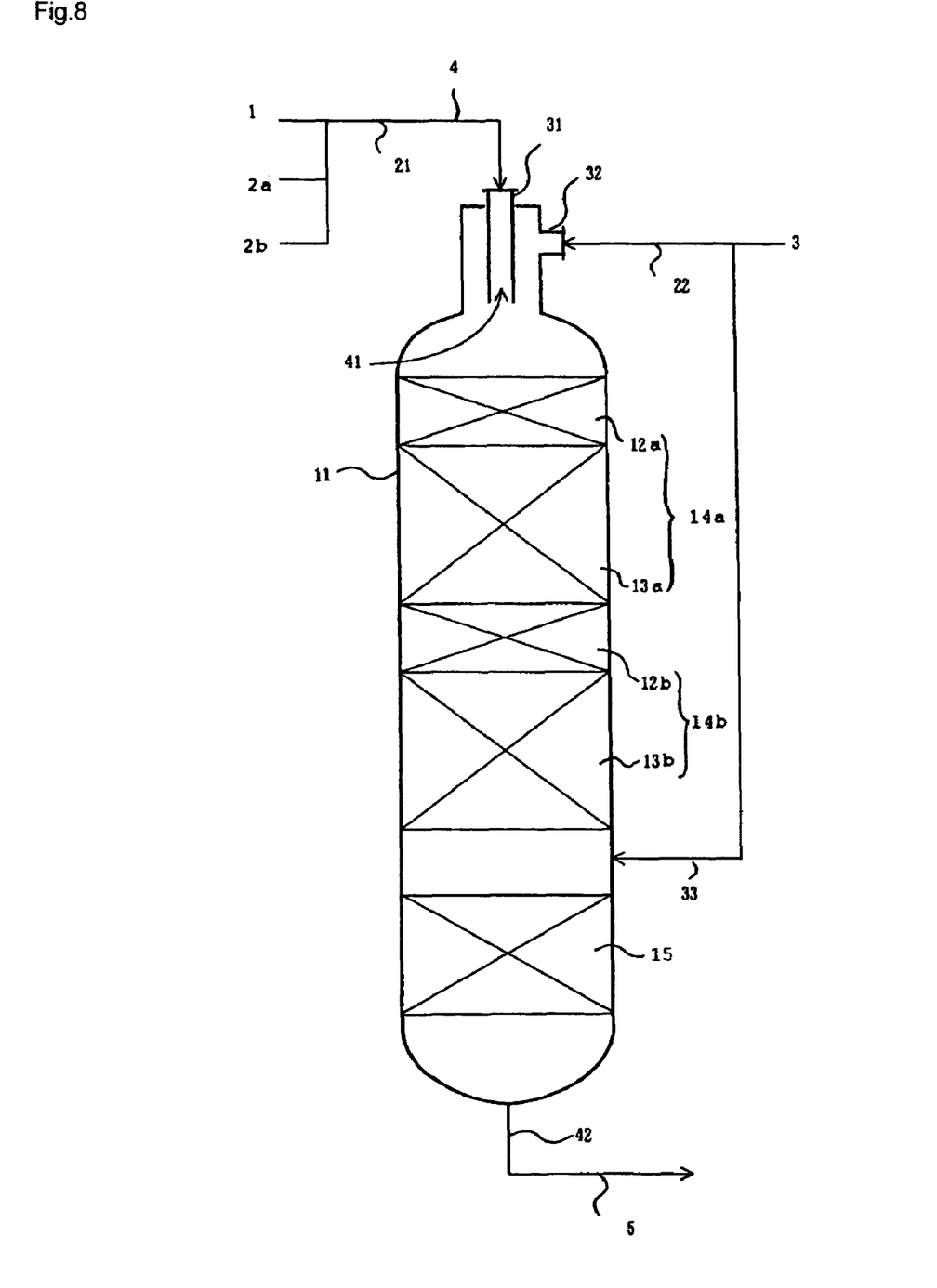
FIGS. 8 and 9 are schematic drawings showing other embodiments of the reformer of the present invention.

The ending temperature of the combustion in the oxidation catalyst layer 12 depends upon the properties and feed amounts of the mixed raw material gas and the oxidizing agent gas. Therefore, the oxidation catalyst layer is preferably designed, for example, in plural stages as necessary in consideration of the maximum temperature of oxidation catalyst layer 12. For example, two sets 14a and 14b of catalyst layers may be consecutively provided inside the reactor vessel 11 as shown in FIG. 8. Here, the set 14a has oxidation catalyst layer 12a and reforming catalyst layer 13a, and the set 14b has oxidation catalyst layer 12b and reforming catalyst layer 13b.

The combustion gas, having a temperature of 800° C. to 1,200° C. for example, after the combustion is fed consecutively to the reforming catalyst layer 13. In the reforming catalyst layer 13, a hydrogen-containing gas is formed by steam reforming reaction. The steam reforming reaction is as a whole an endothermic reaction requiring a large amount of heat.

In the mode shown in FIG. 1, an exothermic reaction generating a large amount of heat takes place in the oxidation catalyst layer 12; successively, an endothermic reaction takes place in the reforming catalyst layer 13 and the heat generated in the oxidation catalyst layer 12 is used effectively.

As the reforming catalyst, there may be used a commercially available catalyst for steam reforming such as Ni based catalyst. As the reforming catalyst, there are preferably used, for example, catalysts described in JP-A-2-043952 (1990), JP-A-4-059048 (1992), JP-A-9-299798 (1997), etc.

Figure 4:
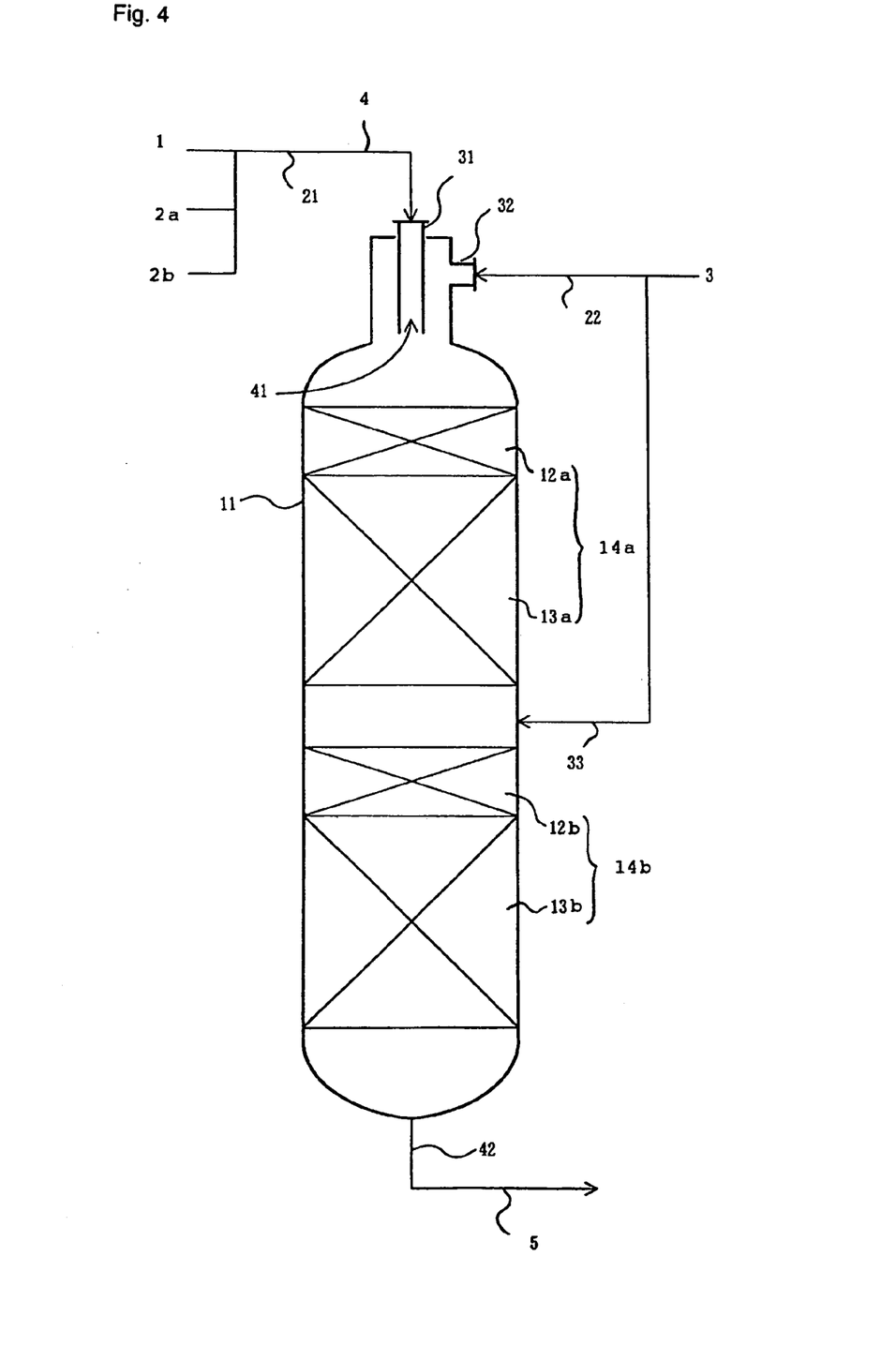
FIG. 4 is a schematic drawing showing another embodiment of the reformer of the present invention.

In this mode, another reforming catalyst layer 15 is formed downstream of the reforming catalyst layer 13. In the reforming catalyst layer 15, the steam reforming reaction proceeds further. By feeding oxidation agent gas between the layers 13 and 15, it is possible to give rise to combustion reaction. Here, unreacted raw material, hydrogen and/or carbon monoxide may be combustible because the gas temperature in this region is high enough. If necessary, another combustion catalyst layer may be provided above the reforming catalyst layer (in this case, as shown in FIG. 4, another set 14b may be provided instead of the reforming catalyst layer 15) in order to enhance the combustion reaction. The combustion raise the temperature of the gas which enters reforming catalyst layer 15 (or 13b in the embodiment shown in FIG. 4) which is the most downstream catalyst layer, and therefore, concentration of unreacted raw material gas in product gas 5 may be lowered. For example, in case that the raw material gas is methane, it is preferable to keep the temperature of the lower end of the reforming catalyst layer 15 (or 13b in the embodiment shown in FIG. 4) at least 900° C. and at most 1000° C. in order to remarkably reduce methane content in product gas 5. For this purpose, oxidation agent gas may be fed to the layer 15 as described above.

The hydrogen-containing gas after the completion of the steam reforming reaction passes through the outlet nozzle 42 and is obtained as a hydrogen-containing gas product via line 5.

It is known to utilize carbon dioxide which is fed from outside or recycled in order to increase the efficiency of steam reforming reaction. In this case, the ratio of feed amounts of steam, carbon dioxide, etc. may be determined based on the charts shown on page 71 of "Hydrocarbon Processing" January, 1986.

Figure 9:
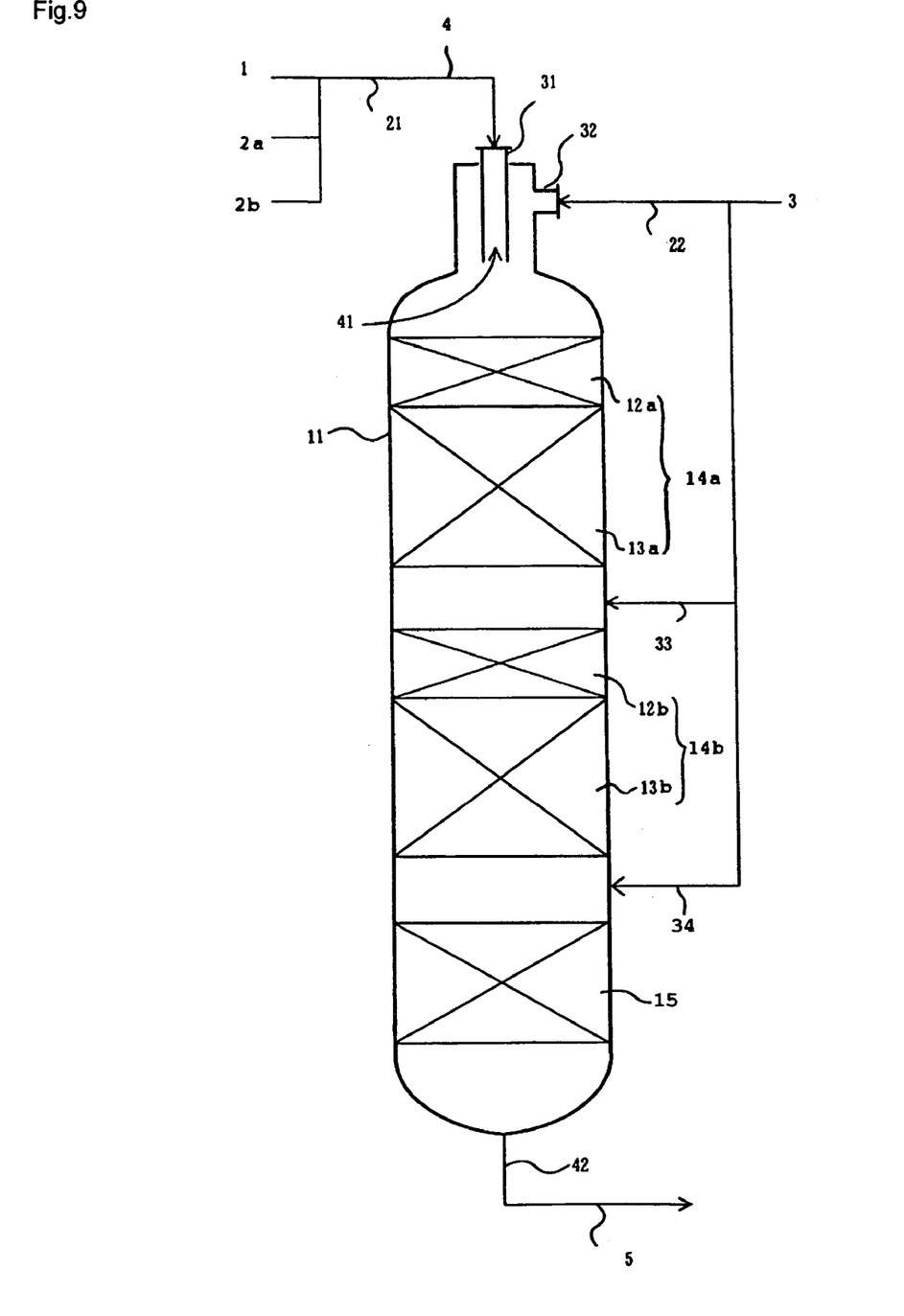

The oxidizing agent gas may be fed in plural stages to the oxidation catalyst when the maximum temperature of the oxidation catalyst layer 12 is high depending upon the properties of the raw material, etc. or when the maximum temperature is desired to be made as low as possible. For example, two sets 14a and 14b of catalyst layers may be provided in reactor vessel 11, and oxidizing agent gas may be fed to each set of the catalyst layers via oxidizing agent gas feeding pipe 32 and second oxidizing agent gas feeding pipe 33 respectively as shown in FIG. 9. The embodiment shown in FIG. 9 has reforming catalyst layer 15 downstream of the two sets 14a and 14b, and oxidizing agent gas is fed to the reforming catalyst layer 15 via third oxidizing agent gas feeding pipe 34.

As the number of the stages for feeding the oxidizing agent gas are more, the maximum temperature of the oxidation catalyst layer 12 is lower; however, the reformer becomes more complex and the advantage in economical efficiency, which is caused by lowering the maximum temperature, may be reduced. Meanwhile, as the number of the stages for feeding the oxidizing agent gas are less, the temperature of the oxidation catalyst layer 12 is higher and the structure of the reformer becomes simpler; however, a higher quality material may be needed for the structure depending upon the case and the reformer may possibly become more expensive. Thus, it is preferred to design the reformer in consideration of these factors.

In FIG. 1, a part of oxidizing agent gas 3 is fed into the inlet nozzle 41 and the remainder is fed into the second oxidizing agent gas-feeding pipe 33 which is provided between the reforming catalyst layer 13 and the reforming catalyst layer 15. In this case, the reformer has two inlets for feeding the oxidizing agent gas to the oxidation catalyst and/or the reforming catalyst in plural stages. Among the two inlets, one is the opening of the oxidizing agent gas-feeding pipe 32, and through this inlet, the oxidizing agent gas is fed to the oxidation catalyst layer 12. The other inlet is the opening of the second oxidizing agent gas-feeding pipe 33, and through this inlet, the oxidizing agent gas is fed to the reforming catalyst layer 15.

Alternatively, when no reforming catalyst layer 15 is provided, an appropriate amount of the oxidizing agent gas may be fed into the reforming catalyst layer 13 besides the oxidizing agent gas fed through the inlet nozzle 41. A reformer of this case, which is not shown in figures, may have the same structure as the reformer illustrated in FIG. 1, except that the second oxidizing agent gas-feeding pipe is connected to the reforming catalyst layer 13. Also in this case, the reformer has two inlets for feeding the oxidizing agent gas to the oxidation catalyst and/or the reforming catalyst in plural stages. One is the opening of the oxidizing agent gas-feeding pipe 32, and through this inlet, the oxidizing agent gas is fed to the oxidation catalyst layer 12. The other inlet is an opening of the second oxidizing agent gas-feeding pipe which opens into the reforming catalyst layer 13.

There are provided gaps between catalyst layers 13 and 15 in FIG. 1, between layers 13a and 12b in FIG. 4, between layers 13b and 15 in FIG. 8, and between layers 13a and 12b and between layers 13b and 15 in FIG. 9. Such gap may be provided or may not be provided.

Figure 10:
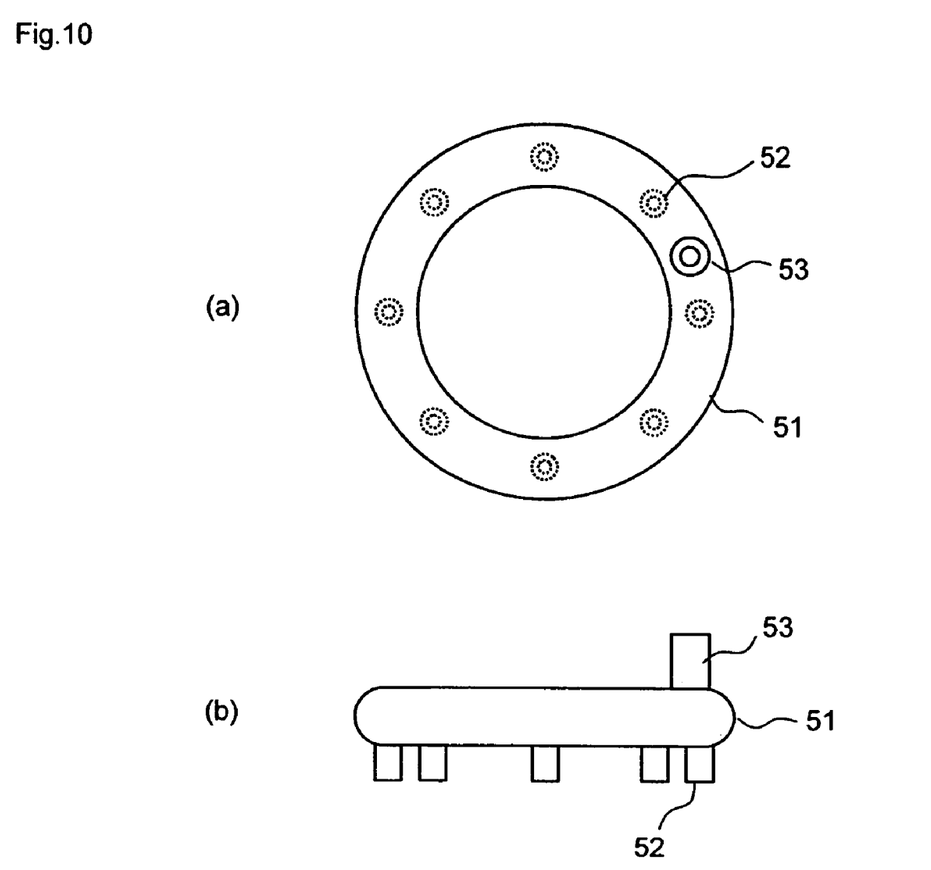
FIG. 10 illustrates an example of an inlet for feeding the oxidizing agent gas, (a) is a top view, (b) is a side view.

The inlet for feeding the oxidizing agent gas may have multi-nozzle structure. For example, as shown in FIG. 10, two or more nozzles 52 and oxidizing agent gas feeding pipe 53 are connected to header 51 which may form a circular shape. This structure is effective in feeding the oxidizing agent gas more uniformly into the catalyst layer, and particularly preferable when the above-described gap is not provided.

EXAMPLES

The present invention is described in detail below by way of non-limiting examples.

Example 1

Using a reformer shown in FIG. 1, a hydrogen-containing gas was obtained using methane gas as raw material gas 1 to be reformed, steam as reforming agent gas 2, and oxygen as oxidizing agent gas 3. As shown in FIG. 1, mixed raw material gas 4 and a part of oxidizing agent gas 3 were fed into a space above oxidation catalyst layer 12 and the remainder of oxidizing agent gas 3 was fed into second oxidizing agent gas-feeding pipe 33. The amount of the oxidizing agent gas fed above the oxidation catalyst layer was 36% and the amount of the oxidizing agent gas fed into the second oxidizing agent gas-feeding pipe was 64% based on the total oxidizing agent gas fed.

Mixed raw material gas 4 and the oxidizing agent gas were fed into reactor vessel 11 at 450° C. There was a gradual temperature increase in the catalyst layers inside the reformer from the start of gas feeding.

The reactor vessel used had an internal diameter of 35 mm and was made of a heat resistant alloy (trade name: KHR 35 CT, manufactured by Kubota corporation).

A set 14 of catalyst layers was 40 mm in height of packed oxidation catalyst and 20 mm in height of packed reforming catalyst.

As the oxidation catalyst, a supported Mn based oxidation catalyst was used.

Reforming catalyst layer 15 provided downstream of the set 14 had a packed height of 300 mm and was filled with a Ni based catalyst.

The pressure was 0.68 MPa, S/C ratio was 2.3, $SV_0$ (oxidation catalyst) was 140,000/hour, and $SV_0$ (reforming catalyst) was 9,000/hour.

Here, the S/C ratio is a ratio of moles of steam (S) to moles of carbon (C) in the raw material gas. $SV_0$ (oxidation catalyst) and $SV_0$ (reforming catalyst) are space velocities at 0.101 Mpa and 0° C. in the oxidation catalyst layer and the reforming catalyst layer respectively.

Figure 5:
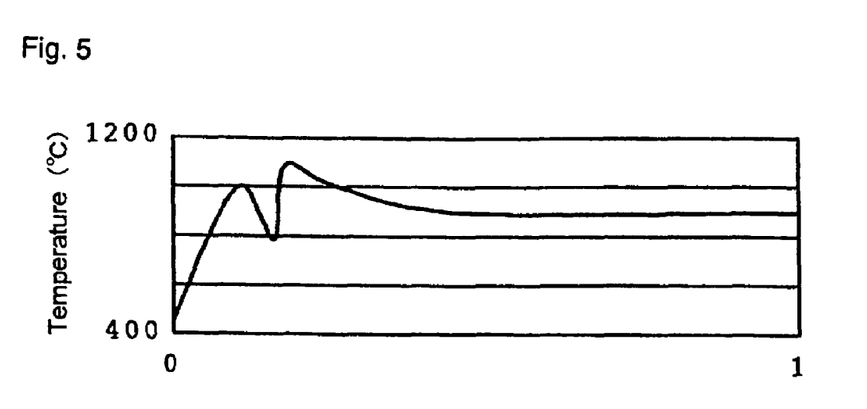
FIG. 5 is a graph showing the catalyst layer temperature distribution seen in Example 1.

Under the above conditions, the maximum temperature in all the catalyst layers inside the reactor vessel was 1,100° C. The temperature distribution in all the catalyst layers inside the reactor vessel is shown in FIG. 5 and the result of temperature measurement is shown in Table 1. In FIG. 5, the abscissa is a normalized value of the distance from the upper end of the set 14 of catalyst layers, and the upper end of the set 14 was taken as 0 (zero) and the lower end of reforming catalyst layer 15 was taken as 1.

Example 2

A reformer shown in FIG. 4 having two sets of catalyst layers, 14a and 14b, was used. The set 14a has oxidation catalyst layer 12a and reforming catalyst layer 13a, and the set 14b has oxidation catalyst layer 12b and reforming catalyst layer 13b.

There were used methane gas as raw material gas 1 to be reformed, and steam 2a and carbon dioxide 2b as reforming agent gases. Using their mixture as mixed raw material gas 4 and oxygen as oxidizing agent gas 3, a synthetic gas was produced. The mixed raw material gas 4 and a part of oxidizing agent gas 3 were fed into a space above combustion catalyst layer 12a, as shown in FIG. 4. 50% of the total feed amount of the oxidizing agent gas was fed into the inlet portion of the reactor vessel 11 via oxidizing agent gas feeding pipe 32, and the remaining 50% was fed into the intermediate portion, which is a space between the sets 14a and 14b, via second oxidizing agent gas feeding pipe 33. In this case, the reformer has two inlets for feeding the oxidizing agent gas to the oxidation catalyst and/or the reforming catalyst in plural stages. Among the two inlets, one is the opening of the oxidizing agent gas-feeding pipe 32, and through this inlet, the oxidizing agent gas is fed to the oxidation catalyst layer 12a. The other inlet is the opening of the second oxidizing agent gas-feeding pipe 33, and through this inlet the oxidizing agent gas is fed to the oxidation catalyst layer 12b.

The mixed raw material gas and 50% of oxidizing agent gas 3 were fed into the reactor vessel at 450° C. via inlet nozzle 41. There was a gradual temperature increase from the start of gas feeding. Incidentally, the remaining 50% of oxidizing agent gas 3 is fed into the reactor vessel at 450° C. via second oxidizing agent gas-feeding pipe 33.

The reactor vessel used had an internal diameter of 35 mm and was made of a heat resistant alloy (trade name: KHR 35 CT, manufactured by Kubota corporation).

Each of the two sets 14a and 14b was 40 mm in height of packed oxidation catalyst and 160 mm in height of packed reforming catalyst.

As the oxidation catalyst, a supported Mn based catalyst was used.

As the reforming catalyst, a Ni based catalyst was used.

The pressure was 0.68 MPa, S/C ratio was 2.3, $CO_2/CH_4$ was 0.004, and $O_2/CH_4$ was 0.66.

Here, the $CO_2/CH_4$ is a molar ratio of carbon dioxide ($CO_2$) to methane ($CH_4$), and the $O_2/CH_4$ is a molar ratio of oxygen ($O_2$) to methane ($CH_4$).

Figure 6:
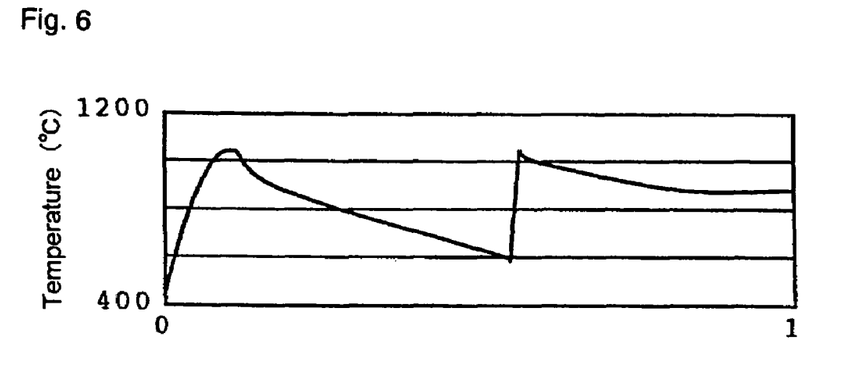
FIG. 6 is a graph showing the catalyst layer temperature distribution seen in Example 2.

Under the above conditions, the maximum temperature in the reactor vessel was 1,050° C. The temperature distributions of the catalyst layers inside the reactor vessel are shown in FIG. 6 and the result of temperature measurement is shown in Table 1. In FIG. 6, the abscissa is a normalized value of the distance from the upper end of upstream the set of catalyst layers 14a, and the upper end of the set 14a was taken as 0 (zero) and the lower end of the set of catalyst layers 14b was taken as 1.

Comparative Example 1

Figure 7:
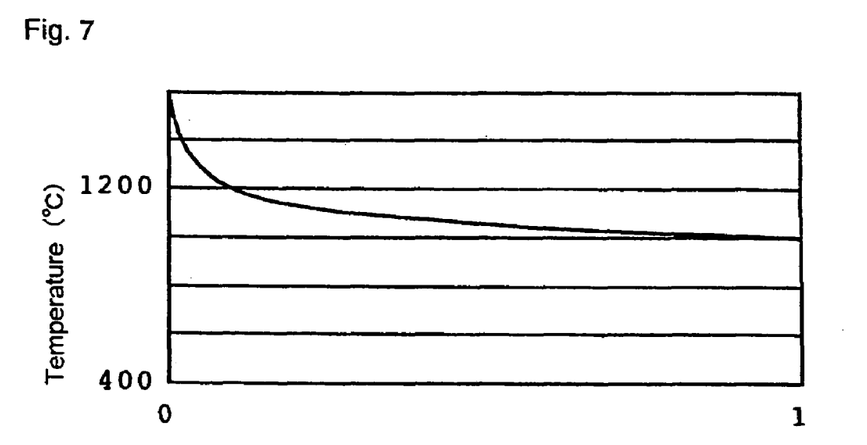
FIG. 7 is a graph showing the catalyst layer temperature distribution seen in Comparative Example 1.

Using methane gas as a raw material gas to be reformed and a mixed gas of oxygen and steam as an oxidizing agent gas, a synthetic gas was obtained using a reformer having a structure shown in FIG. 2. Feeding of the gases to the reformer was made at 600° C. The temperature distribution of catalyst layer in the reactor vessel is shown in FIG. 7 and the gas conditions and result of temperature measurement are shown in Table 1. In FIG. 7, the abscissa is a normalized value of the distance from the upper end of reforming zone 122, and the upper end of reforming zone 122 was taken as 0 (zero) and the lower end of reforming zone 122 was taken as 1.

TABLE 1

|  | Example 1 | Example 2 | Comparative Example 1 |
|---|---|---|---|
| Temperature of gas feeding (° C.) | | | |
| Raw material gas | 450 | 450 | 600 |
| Oxidizing agent gas | 450 | 450 | 600 |
| Maximum temperature inside reactor vessel (° C.) | 1,100 | 1,050 | 2,500 |
| Maximum temperature of reforming zone(122) (° C.) | — | — | 1,600 |

What is claimed is:

1. A reformer for reacting a raw material gas to be reformed, with an oxidizing agent gas and a reforming agent gas in the presence of an oxidation catalyst and a reforming catalyst to obtain a hydrogen-containing gas, comprising:
   a reactor vessel;
   a single set of catalyst layers provided in the reactor vessel, said set of catalyst layers consisting of one oxidation catalyst layer and one first reforming catalyst layer provided downstream of the oxidation catalyst layer;
   one second reforming catalyst layer provided downstream of the first reforming catalyst layer, wherein the oxidation catalyst layer, the first reforming catalyst layer, and the second reforming catalyst layer are the only catalyst layers provided in the reactor vessel;
   an inlet for feeding the oxidizing agent gas to the oxidation catalyst layer, disposed inside the oxidation catalyst layer;
   an inlet for feeding the oxidizing agent gas between the first reforming catalyst layer and the second reforming catalyst layer; and
   an inlet for feeding the raw material gas into the reactor vessel, disposed inside the oxidation catalyst layer close to the inlet for feeding the oxidizing agent gas disposed inside the oxidation catalyst layer,
   wherein each of the inlets for feeding the oxidizing agent gas and the inlet for feeding the raw material gas are separately coupled to the reactor vessel with regard to gas mixing.

2. The reformer according to claim 1, wherein at least one of the inlets for feeding the oxidizing agent gas has a multi-nozzle structure.

3. The reformer according to claim 1, wherein the reforming catalyst is a nickel-based catalyst.

4. The reformer according to claim 1, wherein the inlet for feeding the oxidizing agent gas disposed inside the oxidation catalyst layer and the inlet for feeding the raw material gas disposed inside the oxidation catalyst layer are constructed by a double-pipe structure having an end inside the oxidation catalyst layer.

5. A reformer for reforming a raw material gas to obtain a hydrogen-containing gas therefrom, comprising:
   a reactor vessel having (i) an inlet end from which a raw material gas, a reforming agent gas, and an oxidizing gas are introduced into the reactor vessel, wherein piping for feeding the raw material gas and piping for feeding the oxidizing gas are separately coupled to the inlet end with respect to gas mixing, (ii) an outlet end from which a hydrogen-containing gas is discharged from the reaction vessel, and (iii) a side inlet from which an oxidizing gas is introduced into the reaction vessel;
   one oxidation catalyst layer provided in the reaction vessel for receiving the raw material gas, the reforming gas, and the oxidizing gas from the inlet end and oxidizing the raw material gas, wherein the piping for feeding the raw material gas and the piping for feeding the oxidizing gas of the inlet end extend inside the most upstream oxidation catalyst layer and are open therein;
   one first reforming catalyst layer provided downstream of the oxidation catalyst layer, for reforming the oxidized gases passing therethrough; and
   one second reforming catalyst layer provided downstream of the first reforming catalyst layer to produce a hydrogen-containing gas which is discharged from the reaction vessel through the outlet end, wherein the side inlet is positioned between the first reforming catalyst layer and the second reforming catalyst layer to supply an oxidizing gas to the reforming catalyst layer,
   wherein the oxidation catalyst layer, the first reforming catalyst layer, and the second reforming catalyst layer are the only catalyst layers provided in the reaction vessel.

6. The reformer according to claim 5, wherein the inlet end comprises an inlet nozzle for introducing the raw material gas and the reforming agent gas, and a gas feeding pipe for the oxidation gas.

7. The reformer according to claim 6, further comprising a steam line connected to the inlet nozzle.

8. The reformer according to claim 6, wherein the gas feeding pipe has a branch pipe connected to the side inlet.

9. The reformer according to claim 5, wherein the oxidation catalyst is a palladium-containing catalyst, a manganese-containing catalyst, a lanthanum-containing catalyst, a vanadium-containing catalyst, or a barium-containing catalyst.

10. The reformer according to claim 5, wherein the reforming catalyst is a Ni-containing catalyst.

11. The reformer according to claim 5, wherein the inlet end is provided with a multi-nozzle structure for introducing the oxidizing agent gas therethrough.

12. The reformer according to claim 5, wherein the side inlet has a multi-nozzle structure.

13. The reformer according to claim 5, wherein the piping for feeding the oxidizing agent gas disposed inside the oxidation catalyst layer and the piping for feeding the raw material gas disposed inside the oxidation catalyst layer are constructed by a double-pipe structure having an end inside the oxidation catalyst layer.

14. A method for reforming a raw material gas to obtain a hydrogen-containing gas therefrom, comprising:
   introducing a hydrocarbon-containing raw material gas, a reforming agent gas, and an oxidizing gas into a reactor vessel, wherein the raw material gas and the oxidizing gas are separately introduced inside an oxidation catalyst layer in the reaction vessel without gas mixing;
   passing the hydrocarbon-containing raw material gas, the reforming agent gas, and the oxidizing gas through the oxidation catalyst layer; and
   passing gases discharged from the oxidation catalyst layer having a temperature of 800° C.-1,200° C. through a first reforming catalyst layer to reform the oxidized gases;
   passing gases discharged from the first reforming catalyst layer through a second reforming catalyst layer while separately supplying an additional oxidizing gas between the first reforming catalyst layer and the second reforming catalyst layer, thereby producing a hydrogen-containing gas.

15. The method according to claim 14, wherein the raw material gas is selected from the group consisting of methane, ethane, propane, butane, natural gas, methanol, dimethyl ether, and partially reformed gasses of the foregoing.

16. The method according to claim 14, wherein the reforming agent gas is a gas which endothermically reacts with the raw material gas.

17. The method according to claim 16, wherein the reforming agent gas is steam or carbon dioxide gas.

18. The method according to claim 14, wherein the oxidizing gas is oxygen, oxygen-enriched air, or air.

19. The method according to claim 14, wherein the hydrogen-containing gas is a gas containing hydrogen as a major component and further containing carbon monoxide, carbon dioxide, a hydrocarbon, and/or steam.

20. The method according to claim 14, wherein the hydrogen-containing gas is a gas containing carbon monoxide as a major component and further containing hydrogen, carbon dioxide, a hydrocarbon, and/or steam.

21. The method according to claim 14, wherein the oxidation catalyst is a palladium-containing catalyst, a manganese-containing catalyst, a lanthanum-containing catalyst, a vanadium-containing catalyst, or a barium-containing catalyst.

22. The method according to claim 14, wherein the reforming catalyst is a Ni-containing catalyst.

23. The method according to claim 14, wherein the oxidizing gas supplied to the oxidation catalyst layer and the additional oxidizing gas are the same gas.

24. The method according to claim 14, wherein the gases entering the oxidation catalyst layer has a temperature of 300° C.-600° C.

25. The method according to claim 14, wherein the raw material gas is separately introduced inside the oxidation catalyst layer.

26. The method according to claim 14, wherein the oxidizing gas is introduced into the reactor vessel through an inlet having a multi-nozzle structure.

27. The method according to claim 14, wherein the additional oxidizing gas is introduced into the reactor vessel through an inlet having a multi-nozzle structure.

* * * * *